United States Patent
Widén et al.

(10) Patent No.: US 11,596,112 B2
(45) Date of Patent: Mar. 7, 2023

(54) ENERGY SAVING GREENHOUSE SCREEN

(71) Applicant: AB Ludvig Svensson, Kinna (SE)

(72) Inventors: Sara Widén, Borås (SE); Daniel Asplund, Landvetter (SE)

(73) Assignee: AB Ludvig Svensson, Kinna (SE)

( * ) Notice: Subject to any disclaimer, the term of this patent is extended or adjusted under 35 U.S.C. 154(b) by 0 days.

(21) Appl. No.: 17/419,377

(22) PCT Filed: Jan. 16, 2020

(86) PCT No.: PCT/EP2020/051050
§ 371 (c)(1),
(2) Date: Jun. 29, 2021

(87) PCT Pub. No.: WO2020/148399
PCT Pub. Date: Jul. 23, 2020

(65) Prior Publication Data
US 2022/0071105 A1    Mar. 10, 2022

(30) Foreign Application Priority Data

Jan. 18, 2019 (SE) .................................. 1950063-6

(51) Int. Cl.
*A01G 9/14* (2006.01)
(52) U.S. Cl.
CPC .... *A01G 9/1438* (2013.01); *A01G 2009/1461* (2013.01)
(58) Field of Classification Search
CPC . A01G 9/14; A01G 9/1438; A01G 2009/1461
See application file for complete search history.

(56) References Cited

U.S. PATENT DOCUMENTS 4,097,631 A * 6/1978 Wilken ................ A41D 31/00
428/196
4,644,684 A * 2/1987 Verbeeck ............... D03D 3/02
47/31
(Continued)

FOREIGN PATENT DOCUMENTS

AU    2017272602 A1    12/2018
BE      1020466 A3    11/2013
(Continued)

OTHER PUBLICATIONS

International Search Report and Written Opinion for corresponding PCT Application No. PCT/EP2020/051050, dated Apr. 9, 2020.
(Continued)

*Primary Examiner* — Monica L Perry
*Assistant Examiner* — Aaron M Rodziwicz
(74) *Attorney, Agent, or Firm* — Renner, Otto, Boisselle & Sklar, LLP (57) ABSTRACT

A greenhouse screen comprising strips of film material that are interconnected by a yarn system of transverse threads and longitudinal threads by means of knitting, warp-knitting or weaving process to form a continuous product. The film material comprises a highly transparent, biaxially oriented, UV and flame-stable polyester film which is provided on at least one side with a coating which reduces the reflection of visible light. The greenhouse screen is particularly suited for the cultivation of plants with high light requirements.

18 Claims, 2 Drawing Sheets

(56) References Cited

U.S. PATENT DOCUMENTS

| | | | | |
|---|---|---|---|---|
| 5,164,250 | A * | 11/1992 | Paz Rodriguez | A01G 9/1438 442/186 |
| 5,288,545 | A * | 2/1994 | De Decker | D03D 1/007 139/426 R |
| 5,783,278 | A * | 7/1998 | Nishimura | D03D 49/22 428/102 |
| 9,003,698 | B2 * | 4/2015 | Andersson | B32B 15/09 442/305 |
| 9,167,754 | B2 * | 10/2015 | Andersson | A01G 9/247 |
| 10,136,588 | B2 * | 11/2018 | Toye | A01G 13/0268 |
| 11,395,463 | B2 * | 7/2022 | Holgerson | B32B 27/00 |
| 2004/0232401 | A1 * | 11/2004 | Tsai | B44C 1/10 256/45 |
| 2007/0125898 | A1 | 6/2007 | Mussig et al. | |
| 2009/0300979 | A1 * | 12/2009 | Henningsson | A01G 9/22 47/17 |
| 2010/0062187 | A1 | 3/2010 | Takahashi et al. | |
| 2016/0309663 | A1 | 10/2016 | Cheret | |
| 2017/0208752 | A1 | 7/2017 | Lohre et al. | |
| 2017/0342226 | A1 | 11/2017 | Kliesch et al. | |
| 2020/0315102 | A1 * | 10/2020 | Holgerson | B32B 27/12 |
| 2021/0392822 | A1 * | 12/2021 | Parrein | B32B 5/026 |

FOREIGN PATENT DOCUMENTS

| | | | | |
|---|---|---|---|---|
| CA | 2950207 | A1 | 12/2015 | |
| CN | 201018808 | Y | 2/2008 | |
| CN | 201467763 | U | 5/2010 | |
| CN | 103764734 | A | 4/2014 | |
| CN | 103841820 | A | 6/2014 | |
| CN | 108495547 | A | 9/2018 | |
| EP | 0 109 951 | A1 | 5/1984 | |
| EP | 1 342 824 | A1 | 9/2003 | |
| EP | 1368405 | A1 | 12/2003 | |
| EP | 1527110 | A1 | 5/2004 | |
| EP | 1441001 | A2 | 7/2004 | |
| EP | 3064549 | A1 | 9/2016 | |
| EP | 3251841 | A1 | 12/2017 | |
| FR | 2 071 064 | A1 | 9/1971 | |
| KR | 20090081191 | A | 7/2009 | |
| KR | 20160035296 | A | 3/2016 | |
| NL | 2011979 | C2 | 6/2015 | |
| WO | 2008/091192 | A1 | 7/2008 | |
| WO | 2013/117696 | A1 | 8/2013 | |
| WO | 2015/090548 | A1 | 6/2015 | |
| WO | WO-2015090548 | A1 * | 6/2015 | A01G 9/1407 |
| WO | 2015/181007 | A1 | 12/2015 | |
| WO | WO-2015181007 | A1 * | 12/2015 | A01G 9/1438 |
| WO | 2017/207568 | A1 | 12/2017 | |
| WO | WO-2017207568 | A1 * | 12/2017 | A01G 9/1438 |
| WO | 2018168159 | A1 | 9/2018 | |

OTHER PUBLICATIONS

International Preliminary Report on Patentability for corresponding PCT Application No. PCT/EP2020/051050, dated Sep. 30, 2020.

\* cited by examiner

ENERGY SAVING GREENHOUSE SCREEN

This application is a national phase of International Application No. PCT/EP2020/051050 filed Jan. 16, 2020, which claims priority to Swedish Application No. 1950063-6, filed on Jan. 18, 2019, the entire disclosures of which are hereby incorporated by reference.

TECHNICAL FIELD

The present invention relates to a greenhouse screen of the kind comprising a plurality of flexible strips of film material interconnected by a yarn framework by means of knitting, warp-knitting or weaving process to form a continuous product. More specifically the invention refers to an energy saving greenhouse screen suitable for cultivation of crops with high demands on light transmittance. The screen has specific transparency properties, high UV stability and good flame retardancy. The invention further relates to a method for producing the polyester film and greenhouse screen as well as their use in greenhouses.

BACKGROUND OF THE INVENTION

The aim of protected cultivation in greenhouses is among others to modify the natural environment to increase yield, improve product quality, conserve resources, and to extend production areas and crop cycles. Depending on the location of the greenhouse and the crop grown therein, the crop needs to be protected during the full or parts of the year to avoid harmful stress that will lower the production.

One known type of greenhouse screens comprises a plurality of flexible strips of film material extending in parallel and which by means of a knitting, warp-knitting or weaving process and a yarn system are interconnected to form a continuous product, where the strips form a major part of the surface area of the product. Such a greenhouse screen is known for example through EP 0 109 951. Other examples of screens of this type are shown in FR 2 071 064, EP 1 342 824 and in WO 2008/091192. The strips of flexible material can be of selected film materials providing desired properties with respect to light and/or heat transmission and reflection.

Greenhouse screens are frequently used for energy saving, shading and temperature control during the cultivation of crops in a greenhouse environment. Such screens must meet a number of requirements. On the one hand sufficient amounts of light have to be able to pass through the screens and reach the plants to promote photosynthetic activity during the daylight hours. On the other hand, during the night and early morning hours, the greenhouse screen should retain the heat rising from the ground due to convection inside the greenhouse, both by reflection as well as by re-radiation. Without a greenhouse screen the energy consumption increases in the greenhouse and the setting of an ideal climate is difficult.

The greenhouse screen is of special importance during the early morning hours because of the need to quickly reach an optimal plant growth temperature while simultaneously providing the maximum amount of light to ensure high photosynthetic activity without using excessive amounts of energy for heating. However, in the morning the sun is at a low angle near the horizon and therefore the reflectance of light onto the screen surface is much higher than later during the day when the sun rises higher above the horizon. To solve this problem the films used in the screens are advantageously provided with an anti-glare/anti-reflective coating that will enable sun rays to enter the greenhouse at lower incidence angles and thereby improve photosynthetic activity also during the early morning hours.

The greenhouse screen must also have good UV stability, guaranteeing at least 5 years of use in a greenhouse environment without significant yellowing, embrittlement, cracking of the surface or serious diminishing of the transparency or mechanical properties. Furthermore, fires in greenhouses are a potential hazard and may cause great economic damages if an accident occurs. Therefore a further important property of the greenhouse screen is the high resistance to flammability to prevent fires from starting and spreading too quickly.

EP3064549 describes a flame retardant, biaxially oriented polyester film comprising particles of aluminum dimethyl phosphinate/diethyl phosphinate as flame retardant. The particles are incorporated in the extruded layers and have a mean particle size of 2-3 µm. However, these particles tend to decrease the transparency and increase the haze of the film.

EP1368405 discloses several phosphorous flame retardants like DOPO (CAS 35948-25-5) and derivatives thereof, for use in biaxially oriented polyester films. The additives lead to a transparent film. Derivatives of DOPO which are polymerized in the polyester backbone are preferred for the polyester extrusion process, but on such stabilized films, the application of an anti-glare coating on one or both sides can significantly impair the flame retardancy of the whole structure.

In EP1441001 a separate flame retardant layer is applied on top of a polyester film coated on two sides to improve flame retardancy of the laminate. Said flame retardant layer consists of a gas generating material like magnesium hydroxide. Magnesium hydroxide is also applied as a coating on a polyester film in EP1527110 but a layer of material with magnesium hydroxide (aluminum hydroxide) is only effective at a certain thickness and is incompatible with inline production processes which are limited in coating thickness.

Moreover magnesium hydroxide is not compatible to be extruded with PET, because it cleaves the polymer chain and reduces viscosity of PET significantly. A stable process cannot be achieved this way.

EP3251841 describes a biaxially oriented UV stabilized multilayer polyester film with a transparency of at least 93.5% and an anti-reflective/anti-glare coating on at least one side. Flame retardant additives are included in the polyester base film but it is implied that below a certain particle concentration there is no need of a flame retardant. However, from experience when suitable anti-glare coatings such as acrylics, polyurethanes or silicone coatings are applied on at least one side of such a film, the flame retardancy of the film decreases drastically.

The films described in the state of the art above don't fulfill the optical requirements of at least 93.5% transparency and a haze of less than 8% and/or the requirements of flame retardancy. Particle-containing systems tend to tarnish the final laminate and reduce its transparency. Also, known anti-glare coatings impair the flame retardancy of the whole structure, notably when it is applied on both sides of the film. Surprisingly flame stabilization of the base film alone but not the coating, or a low total particle concentration in the base film doesn't counter the negative burning characteristics of the anti-glare coating.

SUMMARY OF THE INVENTION

The object of the present invention has been to overcome the disadvantages of the state of the art and to provide a greenhouse screen provided with an anti-glare/anti-reflective coating that will enable sun rays to enter the greenhouse and improve photosynthetic activity also during the early morning hours or when the sunlight radiates at a low incidence angle. Yet the film has to have a transparency of at least 93.5%, a haze of no more than 8% and must fulfill the requirements for burning behavior (which means a reduced flammability compared to coated, non-stabilized polyester films). It is further important that the film doesn't deteriorate or loses its flame retardation properties during its life cycle in the greenhouse.

This object is achieved by a greenhouse screen comprising strips of film material that are interconnected by a yarn system of transverse threads and longitudinal threads by means of knitting, warp-knitting or weaving process to form a continuous product. At least some of said strips comprise a film material in the form of a single- or multilayer base film which is provided with at least a first anti-glare/anti-reflective coating on a first surface of the base film. The film material has a transparency of at least 93.5% as measured according to ASTM-D1003-61, and contains a total amount of <0.5 wt. % of particles as calculated on the total weight of the film.

The at least first anti-glare/anti-reflective coating . . .
has a dry thickness of between 60 and 130 nm; and
comprises at least one acrylic acid and/or a methacrylic acid based polymer; and
comprises at least one alkyl phosphonate and/or oligo-alkyl phosphonate flame retardant; and
contains phosphorus in an amount of between 2 wt. % and 18 wt. % as calculated based on the total weight of the film.

The greenhouse screen as disclosed herein has a haze of less than 8% and a satisfactory burning behavior in 3 or less samples out of 5 in the burning test conducted according to EN ISO 9773:1998/A1:2003, before as well as after weathering.

BRIEF DESCRIPTION OF THE DRAWINGS

Example arrangements of greenhouse screens are described hereinafter with reference to the accompanying drawings.

DETAILED DESCRIPTION

The greenhouse screens disclosed herein comprise strips of film material that are interconnected by a yarn system of transverse threads and longitudinal threads by means of knitting, warp-knitting or weaving process to form a continuous product, as will be described further below. The film strips constituting the screen material consist of a single or multilayered polyester film (in the following also referred to as the base film) provided with additives, and a coating (in the following also referred to as an anti-reflection/anti-glare coating) which is applied to at least one surface, preferably to both surfaces of the base film.

The terms "layers" and "coatings" will be used hereinafter, but it is important to point out that there is a distinction between "layers" and "coating"; wherein by a "layer" is meant an extruded or coextruded layer of the polyester film consisting mainly of polyester (e.g. a base layer, intermediate layer or cover layer), while a "coating" is applied onto one or both surfaces of the base film (wherein the base film is optionally a single- or multilayered polyester film) as a solution or dispersion and then dried thereon; coatings may be applied "in-line", i.e. during the actual film production process, or "off-line", i.e. after production of the film.

Base Film

The film total thickness is at least 10 μm and at most 40 μm. The total thickness of the film is preferably at least 11, 12, 13, or 14 μm and at most 35, 30, 29, 28, 27, 26, 25, 24, or 23 μm and ideally at least 14.5 μm and at most 20 μm. If the total thickness of the film is below 10 μm, the mechanical strength of the film is no longer sufficient to withstand, without excessive tensile strain, the tensions arising during use of the screen in the greenhouse environment. Above 40 μm, the film becomes too stiff, and when the screen is not in use and is wound up the resultant "screen roll" is excessively large and correspondingly casts an excessively large shadow.

The film comprises a base layer B. Single-layer films are composed only of this base layer B, while, in the case of a multilayer embodiment, the base film is composed of the base layer B and of at least one further layer which, according to its position in the film, is termed intermediate layer (when there is at least one further layer on each of the two surfaces), or outer layer (where the layer forms an external layer of the film). In the case of the multilayer embodiment, the thickness of the base layer B is at least as great as the sum of the other layer thicknesses. It is preferable that the thickness of the base layer B is at least 55% of the total thickness of the film and ideally at least 63% of the total thickness of the film.

The thickness of the other layers, preferably of the outer layers, is at least 0.5 μm, preferably at least 0.6 μm and ideally at least 0.7 μm. The thickness of the outer layers is less than 3 μm and preferably less than 2.5 μm and ideally less than 1.5 μm. Below 0.5 μm, process stability decreases, and may affect thickness uniformity of the outer layer. Achievement of very good processing stability begins at 0.7 μm. Such further layers are also referred to coextrusion layers herein.

If the outer layers become too thick, cost-effectiveness decreases because in order to ensure that properties (in particular UV resistance) remain good, regenerates should be added only to the base layer B and if the base-layer thickness is too low in comparison to the total thickness of the film, the percentage of regenerates that must be added to this layer in order to close the regeneration cycle is then excessive. This can then also, due to the composition of the base layer, have an adverse effect on properties such as UV resistance and transparency as the outer layers often contain particles in order to improve slip properties (windability improvement). Such particles may lead to loss of transparency via back-scattering and if the proportion of such particles becomes excessive in the outer layers, it becomes markedly more difficult to achieve the high transparency properties of the film.

UV-Stabilization of the Base Film

A film intended for use in a greenhouse must have low light transmittance in the wavelength range from below 370 nm to 300 nm. It is preferable that the transmittance is less than 40%, preferably less than 30% and ideally less than 15% at every wavelength in the stated range. However, light transparency in the wavelength range from 390 nm to 400 nm should be greater than 20%, preferably greater than 30% and ideally greater than 40%, because this wavelength range is significantly effective for photosynthesis, and excessive filtering in this wavelength range would adversely affect plant growth.

The low permeability to UV-light is achieved by the addition of an organic UV stabilizer. Low UV permeability also protects the optionally present flame retardant from rapid destruction and severe yellowing. The organic UV stabilizer as used in the film disclosed herein is selected from the group consisting of triazines, benzotriazoles or benzoxazinones. Particular preference is given here to triazines, because inter alia they have good thermal stability at the processing temperatures from 275 to 310° C. conventional for PET, and exhibit little loss due to gas evolution from the film. 2-(4,6-Diphenyl-1,3,5-triazin-2-yl)-5-(hexyl)oxyphenol (TINUVIN® 1577) is in particular suitable. Most preference is given here to 2-(2-hydroxyphenyl)-4,6-bis(4-phenylphenyl) triazines as marketed by way of example by BASF with trademark TIN UVI N1600™. If these compounds are used, the preferred low transparencies to light below 370 nm can be achieved even with relatively small concentrations of stabilizer, with simultaneous achievement of relatively high transparency at wavelengths above 390 nm.

The base film, i.e. the base layer B, or in the case of a multilayered film, at least one outer layer, preferably both outer layers, therefore comprise at least one organic UV stabilizer. Quantities of UV stabilizers added to the outer layer(s) or to the monolayer film are from 0.3 to 3%, preferably from 0.75 to 2.8% by weight, based on the weight of the respective layer. The outer layers ideally comprise from 1.2 to 2.5% by weight of UV stabilizer. In a multilayered film, it is preferable that a UV stabilizer is also present in the base layer, alongside the outer layers. The content of UV stabilizer in % by weight in said base layer is in this case preferably lower than in the outer layer(s). The abovementioned contents in the outer layer(s) relate to triazine derivatives. If a UV stabilizer from the group of the benzotriazoles or benzoxazinones is used to some extent, or entirely, instead of a triazine derivative, the proportion replaced for the triazine component must be replaced by 1.5 times the quantity of a benzotriazole component or benzoxazinone component. The film is thus protected from embrittlement and yellowing, and the plants as well as the equipment in the greenhouse are thereby also protected from UV light.

Additives to Improve Windability of the Screen

The base layer as well as the outer layer(s) may comprise particles to improve windability. These inorganic or organic particles are by way of example calcium carbonate, apatite, silica, alumina, silicon dioxides, aluminum oxide, crosslinked polystyrene, crosslinked polymethyl methacrylate (PMMA), zeolites and other silicates such as aluminum silicates, polydimethyl siloxane (PDMS) or compatible white pigments such as $TiO_2$ or $BaSO_4$.

However, many whitening polymers, as well as certain polyesters, such as e.g polypropylene, cycloolefin copolymers (COCs), polyethylene, uncrosslinked polystyrene, etc. are incompatible with the main constituent of the film, and should preferably be present in quantities less than 0.1% by weight (based on the weight of the film) and ideally not at all (i.e. 0% by weight), because these particles severely reduce transparency and may have a serious adverse effect on the burning behavior of the film. Moreover, they have a tendency to cause severe yellowing on exposure to UV, and would therefore require considerable additional quantities of UV stabilizer, thus significantly impairing cost-effectiveness.

Due to the negative effect of whitening particles, matting particles such as silicon dioxide particles are preferably added to the outer layers in order to improve film windability. The advantage of using silicon dioxide particles is that they have little transparency-reducing effect. The proportion of these or other particles in any layer should not be more than 3% by weight and preferably less than 1% by weight and ideally less than 0.2% by weight in every layer, based in each case on the total weight of the relevant layer.

In the case of a multilayer embodiment, it is preferable that these particles are added only to one or both outer layers and that only a small proportion thereof passes into the base layer by way of addition of regenerates. The transparency reduction due to the particles required for winding is thus minimal. In one preferred embodiment with good windability, at least one external layer comprises at least 0.07% by weight of matting particles.

Added particles like whitening particles or matting agents can impair the fire-retarding properties of the biaxially oriented film in general. Depending on the compatibility of the particle with the polymer matrix, cavities can form around the particles during the stretching of the film. The less compatible the particles are with the polymer matrix, the more cavities may form. Air can migrate into such cavities and in case of fire, supply oxygen to the fire and make it worse. For this reason it is advantageous to minimize the use of added particles in films where burning properties matter. Exceptions are flame retardant particles, like the ones described in the state of the art. This is the reason why the proportion of particles such as whitening particles (ZnO, $TiO_2$, $BaSO_4$) or matting agents (PMMA, $SiO_2$, polydimethyl siloxane (PDMSQ) preferably is limited to max. 0.5 wt. % (when calculated based on the total weight of the film).

Anti-Glare/Anti-Reflective Coatings

The transparency of the film is achieved if the raw materials, additives and/or particles as described herein are used in the disclosed proportions. However, the increase of transparency is achieved mainly by means of the anti-glare/anti-reflective coatings present on one or both external sides of the film.

The film material of the invention has, at least on one surface, a coating of a material which has a lower refractive index than the polyester base film (i.e. the single base layer B, or the multilayered polyester film). The refractive index of the coating is below 1.64, preferably below 1.60 and ideally below 1.58 at a wavelength of 589 nm in the machine direction of the film.

The coating according to the invention contains at least two components, specifically at least one acrylic component and a component which serves for flame stabilization. The components are described below.

Suitable acrylic components are described for example in EP-A-0144948. Acrylate-based coatings are preferred because they are not prone to exudation of coating components or delamination of parts of the coating in the greenhouse. Particularly suitable are polyacrylates. To reach good optical properties one may also use silicones, polyurethanes or polyvinyl acetates as an anti-glare/anti-reflective coating. However, it is shown that the burning characteristics of acrylates were best and hence acrylates were chosen as coating material to further improve the flame retardancy of the film.

The acrylic component according to the invention consists essentially of at least 50% by weight of one or more polymerized acrylic and/or methacrylic monomer.

The acrylic component preferably consists of an ester of acrylic or methacrylic acid, in particular an alkyl ester, the alkyl group of which contains up to ten carbon atoms, e.g. methyl, ethyl, n-propyl, isopropyl, n-butyl, isobutyl, tertiary butyl, hexyl, 2-ethylhexyl, heptyl and n-octyl groups. Most preferred are adhesion promoter copolymers of an alkyl acrylate, e.g. ethyl acrylate or butyl acrylate, together with an alkyl methacrylate, e.g. methyl methacrylate, in particular in equal molar proportions and in a total amount of 70 to 95 wt.-%, used. The acrylate co-monomer of such acrylic/methacrylic combinations is preferably present at a level of from 15 to 65 mole percent (mol-%), and the methacrylate co-monomer is preferably present at a level generally greater by 5 to 20 mol-% than the proportion of the acrylate co-monomer. The methacrylate is preferably included in a proportion of 35 to 85 mol-% in the acrylic/methacrylic combination.

In a further embodiment, the acrylic component may comprise further co-monomers in a proportion of 0 to 15% by weight, and are suitable for forming an intermolecular crosslinking under the action of elevated temperature.

Suitable co-monomers capable of forming crosslinks are e.g. N-methylolacrylamide, N-methylolmethacrylamide and the corresponding ethers; epoxy materials such as e.g. glycidyl acrylate, glycidyl methacrylate and allyl glycidyl ether; carboxyl group-containing monomers such as e.g. crotonic acid, itaconic acid or acrylic acid; anhydrides, e.g. maleic anhydride or itaconic anhydride; hydroxyl-containing monomers such as e.g. allyl alcohol and hydroxyethyl or hydroxypropyl acrylate or methacrylate; amides such as e.g. acrylamide, methacrylamide or maleic acid amide and isocyanates such as e.g. vinyl isocyanate or allyl isocyanate.

Of the above-mentioned co-monomers, preference is given to N-methylolacrylamide and N-methylolmethacrylamide, primarily because copolymer chains containing one of these monomers are capable, under the action of elevated temperatures, of condensation with each other and thus of formation of the desired intermolecular crosslinks. For copolymers containing the other functional monomers, it is necessary to prepare blends of at least two copolymers with different functional co-monomers in order to achieve the desired crosslinking, e.g. mixing an acrylic/crotonic acid copolymer with an acrylic copolymer containing as functional groups isocyanate, epoxide or N-methylol groups capable of reacting with acidic functional groups.

Other specific combinations of such mixed acrylic copolymers include copolymers with monomers containing epoxy groups as functional groups, in combination with copolymers with monomers containing as functional groups amino, acid anhydride, carboxyl, hydroxyl or N-methylol groups; copolymers with monomers containing as functional groups N-methylol or N-methylol ether groups, in combination with copolymers with monomers containing as functional groups carboxyl, hydroxyl or amino groups; copolymers having monomers containing isocyanate groups as functional groups in association with copolymers with monomers containing carboxyl or hydroxyl groups as functional groups, etc. Preferably, the functional monomers contained in the mixed copolymer systems are present in approximately equimolar amounts.

The acrylic copolymers may also be interpolymerized with up to 49% by weight of one or more halogen-free, non-acrylic, mono-ethylenically unsaturated monomer. Suitable co-monomers are e.g. dialkyl maleates such as e.g. dioctyl maleate, diisooctyl maleate and dibutyl maleate, vinyl ester of a versatic acid, vinyl acetate, styrene, acrylonitrile and the like.

The preferred crosslinkable mixed copolymer compositions for the purposes of this invention are blends in a ratio of about 50:50 (wt %) of an ethyl acrylate/methyl methacrylate/crotonic acid copolymer with an ethyl acrylate/methyl methacrylate/glycidyl acrylate copolymer; mixtures of an ethyl acrylate/methyl methacrylate/methacrylamide copolymer with an ethyl acrylate/methyl methacrylate/N-methylol acrylamide copolymer; or compositions based on copolymers of ethyl acrylate/methyl methacrylate/N-methylol acrylamide, e.g. copolymers containing from 50 to 99% by weight of acrylic and/or methacrylic monomers, from 0 to 49% by weight of the monoethylenically unsaturated monomer and from 1 to 15% by weight of N-methylolacrylamide. Particular preference is given to using copolymers which contain 70 to 95% by weight of acrylic and/or methacrylic monomers, 0 to 25% by weight of the monoethylenically unsaturated monomer and 5 to 10% by weight of N-methylolacrylamide.

Furthermore, in addition to the acrylate component, a foreign crosslinking agent such as: a melamine or urea-formaldehyde condensation product can be used. However, these should be contained in the coating at not more than 3% by weight (in terms of dried coating composition), especially since foreign crosslinkers having a high nitrogen content (e.g., melamine) upon regeneration may cause yellowing of the PET film.

In a preferred embodiment, the dried acrylate coating contains less than 10 wt. %, more preferably less than 5 wt. %, and ideally less than 1 wt. % repeating units containing an aromatic structural element. Above 10% by weight of repeating units having an aromatic structural element, there is a marked deterioration in the weathering stability of the coating.

Flame Stabilization of the Coating

As discussed above, application of known anti-glare coatings to the outer surfaces of a polyester film seems to impair the flame retardancy of the entire film structure. One would expect that an obvious solution to this problem would in this case be to add flame retardant particles also to the base film to reduce the flammability of the entire laminate. However, it turns out that a flame-stabilized single or multilayered film coated by known anti-glare/anti-reflection coatings will not compensate for the negative burning behavior of the coatings.

Moreover, while an un-weathered specimen wherein only the base film, but not the antiglare/antireflection coating(s), had been flame stabilized, initially passed the flame test, the same specimen surprisingly failed the same test after weathering. The negative effect of the antiglare/antireflection coating(s) on flammability seems to become stronger after exposure to (UV) light and water.

Furthermore, and as discussed above, addition of flame retardant additives as particles to polyester films tends to cause haze and lower the transmittance of light and is therefore not a suitable solution to solve the problem of flammability.

Surprisingly the addition of a flame retardant as described herein solely to the anti-glare/anti-reflection coating(s) will stabilize the entire laminate structure such that further flame stabilization of the film is not needed. The coating components as described herein are suitable for the anti-glare/anti-reflection application, and may be applied to at least one surface, but preferably they are applied on both surfaces of the base film. Furthermore, the coating(s) which includes at least one of the flame retardants as described below is relatively thin compared to the base film but impairs the flammability of the entire laminate in comparison to an uncoated base film. The improved flame retardancy holds for both un-weathered and weathered film.

It should be pointed out that in principle one may also add the flame retardant to the base film while the antiglare/ antireflection coating(s) is also stabilized by a flame retardant. However this approach does not improve the flame retardancy of the laminate in a way that outweighs the economic aspects.

Film specimens manufactured according to the disclosure herein wherein at least one, preferably both surfaces the base film has been coated with an anti-glare/anti-reflective coating containing at least one flame retardant as disclosed below, passed the flame test both before and after weathering. Such specimen burns in less than 3 of 5 samples to the 125 mm mark after the first ignition (see test methods below). The base film itself may or may not contain a flame retardant.

The antiglare/antireflection coating contains one or more flame retardants which will improve the burning test of the entire polyester base film.

A flame retardant according to the invention advantageously has the following structures (I) and/or (II):

In which $R^1$, $R^2$, $R^3$ and $R^4$ independently of one another may represent the following radical groups: H; linear alkyl with —$(CH_2)_n$—$CH_3$ (n=0-7); isopropyl; iso- or tertbutyl; linear alkylalcohols with —$(CH_2)_n$—$CH_2$—OH (n=0-3), isopropylalcohol or linear alkyl acids/alkyl acid esters with structure —$(CH_2)_n$—$COOR^5$ (with $R^5$=H; —$(CH_2)_n$—$CH_3$ (n=0-3)); where at least one residual group ($R^1$—$R^4$) is not H.

Z represents a residue of the following groups H; linear alkyl with —$(CH_2)_n$—$CH_3$ (n=0-10); isopropyl; iso- or tertbutyl; linear alkyl alcohols with —$(CH_2)_n$—$CH_2$—OH (n=0-5); isopropyl alcohols or linear alkyl acids/alkyl acid esters with structure —$(CH_2)_n$—$COOR^5$ (with $R^5$=H; —$(CH_2)_n$—$CH_3$ (n=0-3)).

Especially preferred flame retardants comprise compounds based on organophosphorous compounds. However, phenyl substituted phosphate compounds like triphenylphosphate, bisphenol A bis(diphenylphosphate) (CAS 5945-33-5) or oligomeric compounds of hexaphenoxycyclotriphosphazene (CAS 28212-48-8) may cause problems during the manufacture as the phenol may separate during the extrusion process of PET and are hence not compatible.

Preferred are therefore compounds of oligo and/or alkylesters of phosphonic acid or phosphoric acid. These compounds may dissolve in the polymer matrix of the antiglare/ antireflection coating and will unlike embedded particles, not cause reflection or refraction of light. The refractive index of the resulting coating is, after addition of such flame retardants, in the preferred range. Furthermore they are compatible with the production process. The refractive index $n_D$ of the alkyl phosphonate is lower than 1.500, preferably lower than 1.480 and especially preferred below 1.470. If the refractive index of the used alkyl phosphonate is too high, the anti-reflection effect of the entire coating decreases and the transparency of the film becomes too low.

Preferred compounds are alkyl phosphonates and/or oligoalkyl phosphonates (preferably with a Molecular Weight 1000 g/mol). However, polyalkylphosphonate is ineffective as flame retardant as it doesn't migrate sufficiently into the polymeric matrix of the anti-glare/anti-reflective coating during the process conditions. Hence it does not bind adequately enough to the polymer matrix and can be wiped off the film surface.

A preferred alkyl phosphonate is Rucocoat FR2200 by Rudolf Chemie.

The proportion of phosphorus in the anti-glare/anti-reflective coating is between 2 wt. % and 18 wt. %, preferably it is between 3 wt. % and 17 wt. % and most preferably between 4 wt. % and 16 wt. % as calculated based on the total weight of each coating. If the proportion of flame retardant in respect to the anti-glare/anti-reflection component is below the above-mentioned limits, the flame retardancy of the entire laminate becomes too slow. If the proportion is too high, the flame-retardant does not dissolve in the polymer matrix of the anti-glare/anti-reflection coating well enough and may sweat out during production and/or during application. This may also cause a chafing of the coating from the surface.

It should be pointed out that compounds such as ammonium phosphate, aluminum hydroxide or magnesium hydroxide may also improve the fire retarding characteristics of the laminate structure, but they tend to have a negative effect on optical properties of the film and are therefore preferably not used.

Depending on the particle size of the added compounds the haze may increase and transparency may decrease. Aluminum and magnesium hydroxide, which are described in EP1441001, act by generating water and hence need a certain concentration to be effective. Films which include high amounts of said particles also tend to be very hazy and have a low transparency to light. Furthermore, a direct extrusion with polyester is difficult as hydrolytic degradation of the polymer is promoted by such compounds. If the film is produced with regenerates, also particles which are only present in coatings will end up in the extrusion with polyester. The described hydrolytic degradation decreases the viscosity of the polyester which will be difficult to produce. In a preferred production process also regenerates are being used and one or both film surfaces are coated in-line with the coating according to the invention in order to be able to produce the films economically.

Further Coating Components

Furthermore, up to 10% by weight of additives can be added to the coating. These include surfactants (ionic, nonionic and amphoteric), protective colloids, UV stabilizers, defoamers and biocides. Particularly suitable as surfactants are SDS (sodium dodecyl sulfate), polyethylene glycol-based surfactants with a C8-C20 acyl tail (branched or unbranched) and a polar head with —$(CH_2$—$O)$ nR units (where n=8-100 and R=—OH, —$CH_3$ or —$CH_2$—$CH_3$) such as: Lutensol AT50 or Tergitol.

In a particularly preferred embodiment, the coating contains at least 1% by weight, based on the dry weight, of a UV stabilizer, particular preference being given to Tinuvin 479 or Tinuvin 5333-DW (BASF, Ludwigshafen, Germany).

Less preferred are HALS (hindered amine light stabilizers), since during regeneration (recycling of film residues from production) these lead to a distinct yellowing of the material and thus to a reduction in transparency.

Coating Thickness

The dry thickness of the anti-glare/anti-reflective coating (s) is in each case at least 60 nm, preferably at least 70 nm and in particular at least 78 nm, and is at most 130 nm, preferably at most 115 nm and ideally at most 110 nm. An ideal transparency increase in the desired wavelength range is thus achieved. Advantageously the thickness of the coating is more than 87 nm, and particularly more than 95 nm. In this preferred embodiment, the thickness of the coating is preferably less than 115 nm and ideally less than 110 nm.

Within this narrow thickness range, not only is the transparency increase close to the optimum, but at the same time reflection of the UV and blue region of light is increased in comparison to the remainder of the visible spectrum. On the one hand, this saves UV stabilizer, but in particular it also leads to a shift of the blue/red ratio towards red. This achieves improved plant growth, increases flowering and fruiting, and reduces the incidence of stunted plant growth due to inadequate illumination.

The surface of the film opposite to the first anti-glare/anti-reflective coating described above is also advantageously provided with an anti-reflective modification. In a preferred embodiment, this is likewise an anti-reflective coating applied to the second film surface, opposite the first film surface. This second coating corresponds to the description of the coating applied to the first surface and in one preferred embodiment is the same as the first coating in respect of material and coating thickness.

The coating(s) are preferably applied to the film in-line before transverse stretching by means of known processes (e.g. reverse gravure roll or else Meyer bar), from preferably aqueous dispersion.

To prepare the antireflection coating, all components may be presented either dry or pure (i.e. in undissolved or undispersed state) and then dispersed (or dissolved) in an aqueous medium, or each individually pre-dispersed or dissolved in an aqueous medium and subsequently charged mixed and diluted with water if necessary. If the components are each dispersed individually or used in solution, it has proved to be advantageous if the resulting mixture (the antireflection coating) is homogenized with a stirrer for at least 10 min before it is used. If the components are used in their pure form (i.e. in the undissolved or undispersed state), it has proved to be particularly advantageous if, during dispersion, high shear forces are applied by using appropriate homogenization methods.

Depending on the type of application/application method i.e. inline (e.g. reverse engraving, Mayerbar, etc.) or off-line (e.g. forward engraving)), the non-aqueous fraction of the dispersion is preferably in the range from 5 to 35% by weight and more preferably in the range from 10 to 30 wt.-%.

The transparency values of >95.3% that are particularly preferred according to the invention can be achieved with an antireflective coating applied on both surfaces of the film.

Production Process

The polyester polymers of the individual layers are produced by polycondensation either from dicarboxylic acids and diol or else from the esters of the dicarboxylic acids, preferably the dimethyl esters, and diol. Useful polyesters preferably have a standard viscosity (SV) value of in the range of 500 to 1300, where the individual values are less important but the average SV value of the raw materials used should be greater than 700 and is preferably greater than 750.

The particles, and also UV stabilizers, can be added before production of the polyester is concluded. For this purpose, the particles are dispersed in the diol, optionally ground, decantered or/and filtered, and added to the reactor, either in the (trans) esterification step or in the poly-condensation step. In a preferred procedure a concentrated particle-containing or additive-containing polyester masterbatch can be produced by using a twin-screw extruder and diluted with particle-free polyester during film extrusion. It has been found here that masterbatches comprising less than 30% by weight of polyester are advantageously avoided. In particular, masterbatches comprising $SiO_2$ particles should comprise no more than 20% by weight of $SiO_2$ (because of gelling risk). Another possibility is to add particles and additives directly during film extrusion in a twin-screw extruder.

When single-screw extruders are used, it has been found that the polyesters are advantageously pre-dried. When a twin-screw extruder with a degassing zone is used, the drying step can be omitted.

The polyester or polyester mixture of the layer, or of the individual layers in the case of multilayer films, is first compressed and liquefied in extruders. The melt(s) is/are then formed into flat melt films in a mono- or coextrusion die to give, forced through a slot die and drawn off on a chill roll and on one or more take-off rolls, where the material cools and solidifies.

The film of the invention is biaxially oriented, i.e. biaxially stretched. Biaxial orientation of the film is most frequently carried out sequentially. Orientation here is preferably carried out first in the longitudinal direction (i.e. in the machine direction=MD) and then in the transverse direction (TD), i.e. perpendicularly to the machine direction. Orientation in the longitudinal direction can be carried out with the aid of two rolls running at different speeds corresponding to the desired stretching ratio. The transverse orientation process generally uses an appropriate tenter frame.

The temperature at which stretching is carried out can vary within a relatively wide range, and depends on the desired properties of the film. Stretching in the longitudinal direction is generally carried out in the temperature range from 80 to 130° C. (heating temperature from 80 to 130° C.) and stretching in the transverse direction is generally carried out in the temperature range from 90° C. (start of stretching) to 140° C. (end of stretching). The longitudinal stretching ratio is in the range from 2.5:1 to 4.5:1, preferably from 2.8:1 to 3.4:1. A stretching ratio above 4.5 leads to significantly reduced manufacturability (break-off). The transverse stretching ratio is generally in the range from 2.5:1 to 5.0:1, preferably from 3.2:1 to 4:1. A transverse stretching ratio higher than 4.8 leads to significantly reduced manufacturability (break-off) and should therefore preferably be avoided. For achievement, of the desired film properties it has been found that the stretching temperature (in MD and TD) is advantageously below 125° C. and preferably below 118° C.

Before transverse stretching, one or both surfaces of the film can be coated in-line by processes known per se. In-line coating can preferably serve to apply a coating in order to increase transparency (anti-reflective). During the heat-setting that follows, the film is maintained at a temperature of from 150 to 250° C. for a period of about 0.1 to 10 s under tension and, in order to achieve the preferred shrinkage values and elongation values, relaxed in transverse direction by at least 1%, preferably at least 3% and particularly preferably at least 4%. This relaxation preferably takes place in the temperature range from 150 to 190° C.

In order to reduce transparency bow, the temperature in the first setting zone is preferably below 220° C. and particularly preferably below 190° C. For the same reason, furthermore, at least 1%, preferably at least 2%, of the total transverse stretching ratio should preferably relate to the first setting zone, where no further stretching usually occurs. The film is then wound up in a conventional manner.

An especially economic production method of the polyester film uses reclaimed/regenerated material at a share of up to 70 wt. % in respect to the total weight of the film. The reclaimed material can be added to the extrusion of the polymer without negatively affecting the physical properties of the film.

In one embodiment the film is coated by offline technology in an additional process step which takes place after the film production. In this case a forward gravure roller can be used to apply the anti-glare/anti-reflection coating on a surface of the film. The upper limits (i.e., maximum wet application) are set by the process conditions and the viscosity of the coating dispersion and find their upper limit in the processability of the coating dispersion.

Application

The films as described herein are highly transparent, UV and flame stabilized and on at least one side provided with a coating that reduces the refection of visible light. With these characteristics, they have excellent suitability as high-transparency convection barriers, in particular for the production of energy-saving sheet materials in greenhouses. The film material as described herein is for this purpose cut into narrow strips from which, in combination with polyester yarn (which must also be UV-resistant) a woven fabric/laid screen as described below is then produced which is suspended in a greenhouse. The strips made of film as described herein can be combined with strips made of other films (in particular with films with a light-scattering effect). Alternatively, the film itself (without textile) can be installed in a greenhouse.

FIGS. 1-4 disclose greenhouse screens 10 which according to the invention comprise a plurality of narrow film strips 11 held together by a yarn framework 12, 13a, 13b; 14, 15; 18, 19. The strips are preferably arranged closely edge to edge, so that they form a substantially continuous surface. In all embodiments the distance between the strips has been exaggerated for the sake of clarity to make the yarn system visible in the figures. The screen has a longitudinal direction y, and a transverse direction x, wherein the strips 11 extend in the longitudinal direction y. In some embodiments strips 11' may extend also in the transverse direction x. A typical width of the strips is between 2 mm and 10 mm.

Figure 1:
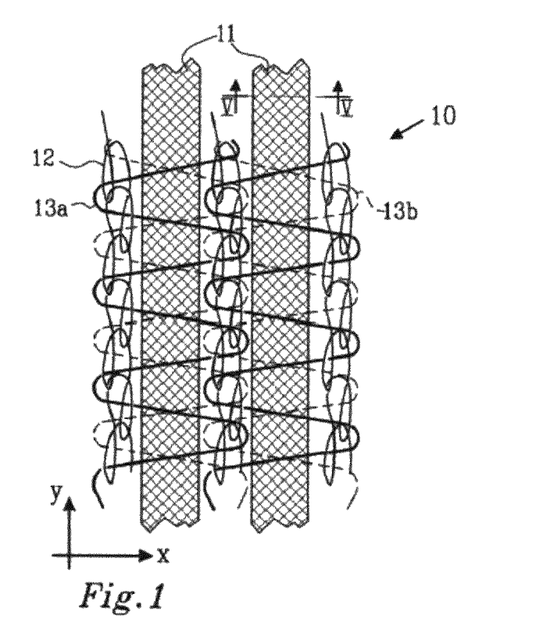
FIG. 1 shows on an enlarged scale a part of warp-knitted screen according to one embodiment.

In FIG. 1 film strips are interconnected by a warp knitting procedure as described in EP 0 109 951. The yarn framework comprises warp threads 12 forming loops or stitches and primarily extending in the longitudinal direction, y. The warp threads 12 are connected to one another by weft threads 13a and 13b extending across the film strips.

FIG. 1 shows an example of a mesh pattern for a fabric manufactured through a warp knitting process in which four guide bars are used, one for the strips 11, two for the connecting threads 13a and 13b extending transversely to the film strips and one for the longitudinal warp threads 12.

The space between the film strips 11 have been strongly exaggerated in order to make the mesh pattern clear. Usually the film strips 11 are located closely edge to edge. The longitudinal warp threads 12 are arranged on one side of the screen, the underside, while the transverse connection threads 13a and 13b are located on both sides of the fabric, the upper and the underside. The term "transverse" in this respect is not restricted to a direction perpendicular to the longitudinal direction, but means that the connection threads 13a and 13b extends across the film strips 11 as illustrated in the drawings. The connection between the longitudinal weft threads and the transverse threads are made on the underside of the fabric. The film strips can in this way be arranged closely edge to edge without being restricted by the longitudinal weft threads.

The longitudinal weft threads 12 in FIG. 1 extend continuously in an unbroken fashion along opposite edges of adjacent film strips, in a series of knitted stitches, in a so called open pillar stitch formation.

The transverse threads 13a and 13b pass above and below the film strips at the same location, i.e. opposed to each other to fixedly trap the film strips. Each knitted stitch in the longitudinal warp threads 12 has two such transverse threads 13a and 13b engaging with it.

Figure 2:
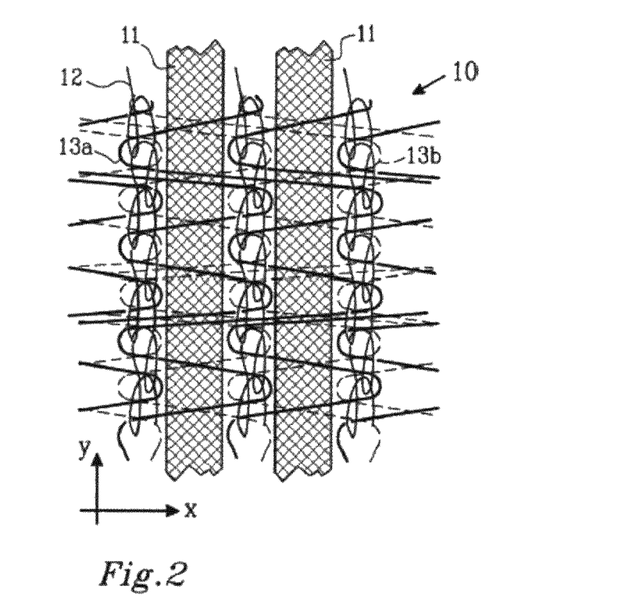
FIG. 2 shows a part of a warp-knitted screen according to another embodiment.

FIG. 2 shows another example of a mesh pattern for a fabric similar to the one shown in FIG. 1. The difference is that the transverse threads 13a and 13b pass over one and two film strips 11 in an alternating way.

Figure 3:
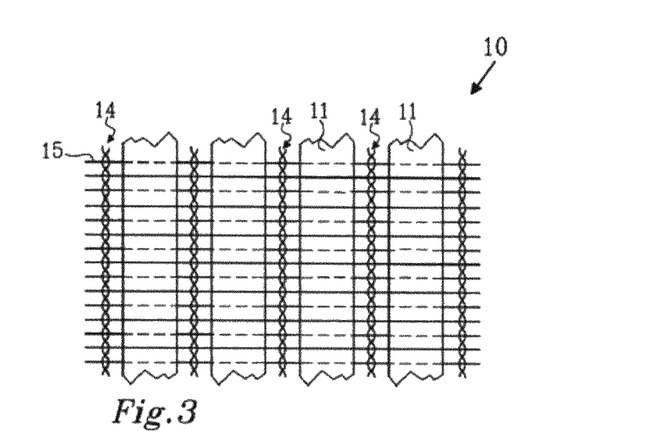
FIG. 3 shows on an enlarged scale a part of a woven screen.

FIG. 3 shows a woven screen in which the film strips 11 are interconnected by warp threads 14 extending in longitudinal direction y, and interwoven with weft threads 15 extending across the film strips primarily in the transverse direction x.

Figure 4:
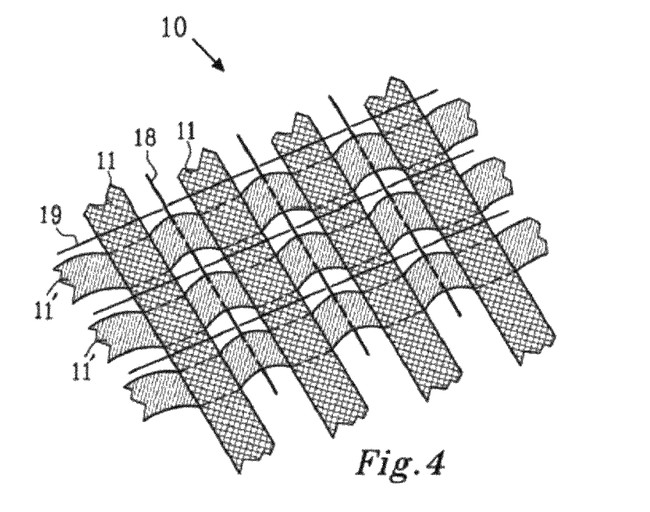
FIG. 4 shows a part of a woven screen according to a further embodiment.

FIG. 4 shows another embodiment of a woven screen as described in U.S. Pat. No. 5,288,545 comprising film strips 11 (warp strips) extending in longitudinal direction y, and film strips 11" (weft strips) extending in transverse direction x. The weft strips 11" in the transverse direction may as shown in FIG. 4 always be on the same side of the warp strips 11 in longitudinal direction or may alternate on the upper and underside of the warp longitudinal strips 11. The warp and weft strips 11 and 11" are held together by a yarn framework comprising longitudinal and transverse threads 18 and 19. The screen may comprise open areas that are free from strips to reduce heat build-up below the screen.

Description of Test Methods

The following test methods were used to characterize the raw materials and the films:

UV/Vis Spectra and Transmittance at Wavelength x

The transmittance of the films at certain wavelengths was tested in a LAMBDA® 12 or 35 UV/Vis double-beam spectrometer from PerkinElmer USA. An approximately (3×5) cm large film sample is placed over a flat sample holding device perpendicular to the measuring beam in the beam path. The measurement beam passes by way of a 50 mm integrating sphere onwards to the detector, where the intensity of the transparency of the film at a desired wavelength is determined. Air is used as background.

Transparency and Haze Transparency and haze of the film was measured in accordance with ASTM-D1003-61 by means of a Hazegard Hazemeter XL-21 1 from BYK-Gardner (Wesel Germany).

UV-Stability

UV stability was determined as described on page 8 in DE 69731750 (DE of WO9806575), weathering time being 2000 h instead of 1000 h, and the ultimate tensile strength (UTS) value is stated in % of the initial value.

SV-Value (Standard Viscosity)

Standard viscosity (SV) in dilute solution was measured by a method based, on DIN 53728 Part 3, in an Ubbelohde viscometer at (25±0.05°) C. Dichloroacetic acid (DCA) was used as solvent. The concentration of the dissolved polymer was 1 g of polymer/100 ml of pure solvent. Dissolution of the polymer required 1 hour at 60° C. After this time, if the samples were not completely dissolved up to two dissolution attempts were made, in each case for 40 minutes at 80° C., and the solutions were then centrifuged for 1 hour at a rotation speed of 4100 rpm. The dimensionless SV value is determined as follows from the relative viscosity ($\eta_{ref}=\eta/\eta_s$):

$$SV=(\eta_{ref}-1)\times 1000$$

The proportion of particles in the film or polymer was determined by ashing and corrected via an appropriate increase of input weight, i.e.:

$$\text{Input weight} = \frac{\text{(Input weight corresponding to 100\% polymer)}}{[(100-\text{particle content. in Wt.}-\%)\cdot 0.01]}$$

Determination of Refractive Index as a Function of Wavelength

The refractive index of a film substrate and of an applied coating was determined as a function of wavelength by spectroscopic ellipsometry. J. A. Woollam et al, Overview of variable-angle spectroscopic ellipsometry (VASE): I. Basic theory and typical applications, Proc. SPIE Vol. CR72, p. 3-28, Optical Metrology, Ghanim A. Al-Jumaily; Ed.

The base film without coating or modified coextruded side is first analyzed. Back-side reflection is suppressed by using an abrasive paper with the smallest possible particle diameter (for example P1000) to roughen the opposite side of the film. The film is then subjected to measurement by a spectroscopic ellipsometer, in this case an M-2000 from J. A. Woollam Co., Inc., equipped with a rotating compensator. The machine direction (MD) of the sample is parallel to the light beam. The wavelength used for measurement is in the range from 370 to 1000 nm; the measurement angles are 65, 70 and 75°.

A model is then used to simulate the ellipsometric data $\psi$ and $\Delta$. The Cauchy model $$n(\lambda) = A + \frac{B}{\lambda^2} + \frac{C}{\lambda^4}$$

(wavelength $\lambda$ in μm) is suitable for this purpose in the present case.

The parameters A, B and C are varied in such a way that the data provide the best possible fit with $\psi$ and $\Delta$ in the measured spectrum. The validity of the model can be checked by using the mean square error (MSE) value, which compares model with measured data ($\psi(\lambda)$ and $\Delta(\lambda)$) and should be as small as possible.

$$MSE = \sqrt{\frac{1}{3n-m}\sum_{i=1}^{n}\left[(N_{E,i}-N_{G,i})^2 + (C_{E,i}-C_{G,i})^2 + (S_{E,i}-S_{G,i})^2\right]} \cdot 1000$$

n = number of wavelengths, m = number of fit parameters, $N = \cos(2\Psi)$, $C = \sin(2\lambda)\cos(\Delta)$, $S = \sin(2\Psi)\sin(\Delta)$ [1]

The Cauchy parameters A, B and C obtained for the base film allow calculation of the refractive index n as a function of wavelength, with validity in the range of measurement from 370 to 1000 nm.

The coating, or a modified coextruded layer, can be analyzed analogously. The parameters of the film base are now already known, and should be kept constant in the modelling procedure. Determination on the coating of the coextruded layer also requires roughening of the reverse side of the film, as described above. The Cauchy model can likewise be used here to describe the refractive index as a function of wavelength. However, the respective layer is now present on the known substrate, and this is taken into account in the relevant evaluation software (CompleteEASE or WVase). The thickness of the layer influences the spectrum obtained, and must be taken into account in the modelling procedure.

Refractive Index $n_D$ of a Liquid Material

To determine the refractive index of a liquid one uses an Abbe refractometer.

The apparatus should have a temperature of 23° C. The liquid is applied on the well-cleaned prism by a pipette. The whole area of the prism is covered by the liquid. The second prism is then folded down and pressed firmly. The upper knurled screw is adjusted while looking in the ocular of the refractometer until a sharp transition from bright to dark can be seen. The sharp transition line is then shifted by the second knurled screw until it is in the crossfade of the ocular. One can now read the refractive index from the indicator scale.

Burning Test

The burning test is conducted according to the test method described in *Plastics—Determination of burning behaviour of thin flexible vertical specimens in contact with a small-flame ignition source—Amendment 1 Specimens* (EN ISO 9773:1998/Amd 1:2003). The samples are conditioned for one day at (23±2) ° C. and a relative humidity of (50±5) %. In the regard of this invention it is of special concern whether the specimen burns to the 125 mm mark or not. The result of the test also contains information if the specimen reached the mark after the first or the second ignition, or not at all. For each film the test is conducted on five specimens.

EXAMPLES

The Examples and Comparative Examples as disclosed herein use the following raw materials:

PET1=Polyethylene terephthalate made of ethylene glycol and terephthalic acid with a SV of 820 and a DEG-content of 0.9 wt. % (diethylene glycol content as monomer).

PET2=polyethylene terephthalate with a SV value of 730, containing (6-oxodibenzo [c, e]-[1,2] oxaphosphorin-6-yl-methyl) succinic acid bis (2-hydroxyethyl) ester (Ex the compound is a flame stabilizer which is typically added to the extrusion in masterbatch form cf. EP1368405) as co-monomer, where the resultant phosphorus content in the polymer is 18 000 ppm.

PET3=polyethylene terephthalate of ethylene glycol and dimethyl terephthalate with a SV value of 820 and DEG content of 0.9% by weight (diethylene glycol content as monomer) and 1.5 wt. % by weight of Sylobloc 46 with a d50 of 2.5 μm. Manufactured by a Purified Terephtalic Acid (PTA) process. Catalyst potassium titanyl oxalate with 18 ppm titanium. Transesterification catalyst zinc acetate.

PET4=polyethylene terephthalate with a SV value of 700, comprising 20% by weight of TINUVIN® 1577. The composition of the UV stabilizer is as follows: 2-(4,6-diphenyl-1,3,5-triazin-2-yl)-5-(hexyl)oxyphenol (TINUVIN® 1577 from BASF, Ludwigshafen, Germany). TINUVIN® 1577 has a melting point of 149° C. and is thermally stable at 330° C.

Example 1

Cover layers (A) and (C) of the polyester film:
Mixture of 10% PET4, 7.2% PET3 and 82.8% PET1
Base layer (B) of the polyester film:
Mixture of 90% PET1 and 10% PET4
Coating, (applied onto the co-extruded cover layers (A) and (C) of the polyester film):
As a flame retardant 13 wt. % alkylphosphonate (RUCO-COAT FR2200, Rudolf Chemie) is dissolved in water. The pH is adjusted by addition of ammonia solution to 7.5 to 8.0. While being stirred 10 wt. % of an aqueous acrylate dispersion (EP-A-0144948, Ex 1 with the surfactant SDS and Tergitol 15-S-40) is added.

The listed raw materials were melted in each case in an extruder per layer at 292° C. and extruded through a three-layer slot die onto a drawn to 50° C. draw-off roller. The resulting amorphous prefilm was then first stretched longitudinally. The elongated film was corona treated and then coated by reverse gravure coating with the described coating formulation on a first surface of the film. With a second reverse gravure roller the second surface of the film can be treated. The film is thereafter dried at 100° C. and is stretched in the transverse direction. Thereafter a heat setting takes place and the film is wound up. The final thickness of the film is 19 μm (the cover layers A and C each have a thickness of 1 μm).

The conditions of the individual steps can be seen in Table 1.

TABLE 1

| PET production process parameters for Example 1. | | |
|---|---|---|
| Longitudinal stretching (MD) | Pre heat temperature | 75-115 ° C. |
| | Stretching temperature | 115 ° C. |
| | Stretching factor | 3.8 |

TABLE 1-continued

| PET production process parameters for Example 1. | | |
|---|---|---|
| Transversal stretching (TD) | Pre heat temperature | 100 ° C. |
| | Stretching temperature | 112 ° C. |
| | Stretching factor | 3.9 |
| Heat setting | Temperature | 237- 150 ° C. |
| | Duration | 3 s |
| | Relaxation in TD at 200-150° C. | 5 % |
| | Temperatur 1. area | 170 ° C. |

The thickness of the coating which is applied to one or two surfaces of the film is 80 nm each. The properties of the films are described in Table 3.

Examples 2 to 4 and Comparative Examples 1 to 10

The production process of the other examples and comparative examples are the same as described for Example 1. The recipes of the base film, coextruded layers and the coatings are listed in Table 2.

Comparative Example 4

The coating dispersion of Comparative Example 4 consists of 7.5 wt. % polyurethane Neorez R600 by DSM and 7.5 wt. % by oxazoline crosslinker Epocros WS-700 by Sumitomo.

Comparative Example 5

The coating dispersion of Comparative Example 5 consists of a silicone coating described in example 1 of EP-A-0769540

Comparative Examples 6 and 7

The coating dispersions of Comparative Examples 6 and 7 consist of an acrylate described in EP-A-0144948 and ammonium phosphate (Exolit AP420 by Clariant, 45 wt. %, aqueous dispersion).

TABLE 2

| Recipes for Examples and Comparative Examples | | | | | | | |
|---|---|---|---|---|---|---|---|
| | Ex. 1 | Ex. 2 | Ex. 3 | Ex. 4 | Comp. Ex. 1 | Comp. Ex. 2 | Comp. Ex. 3 |
| Film recipe | | | | | | | |
| Coex layer A | 1 μm | 1 μm | 1 μm | 1 μm | 1 μm | 1 μm | 1 μm |
| PET4 (%) | 10.0 | 10.0 | 10.0 | 10.0 | 10.0 | 10.0 | 10.0 |
| PET3 (%) | 7.2 | 7.2 | 7.2 | 7.2 | 7.2 | 7.2 | 7.2 |
| PET1 (%) | 82.8 | 82.8 | 82.8 | 82.8 | 82.8 | 82.8 | 82.8 |
| PET2 (%) | | | | | | | |
| Base layer | 17 μm | 17 μm | 17 μm | 17 μm | 17 μm | 17 μm | 17 μm |
| PET4 (%) | 10.0 | 10.0 | 10.0 | 10.0 | 10.0 | 10.0 | 10.0 |
| PET2 (%) | | | | | | | |
| PET1 (%) | 90.0 | 90.0 | 90.0 | 90.0 | 90.0 | 90.0 | 90.0 |
| Coex layer C' | 1 μm | 1 μm | 1 μm | 1 μm | 1 μm | 1 μm | 1 μm |
| PET4 (%) | 10.0 | 10.0 | 10.0 | 10.0 | 10.0 | 10.0 | 10.0 |
| PET3 (%) | 7.2 | 7.2 | 7.2 | 7.2 | 7.2 | 7.2 | 7.2 |
| PET1 (%) | 82.8 | 82.8 | 82.8 | 82.8 | 82.8 | 82.8 | 82.8 |
| PET2 (%) | | | | | | | |
| Coating recipe | | | | | | | |
| Coating application on surface A or A&C | A&C | A&C | A&C | A | Uncoated | A | A&C |
| Acrylate | 10 | 5 | 15 | 10 | | 15 | 15 |
| Alkylphosphonate | 13 | 25 | 5 | 15 | | | |

TABLE 2-continued

Recipes for Examples and Comparative Examples

| | | | | |
|---|---|---|---|---|
| Ammonium phosphate | | | | |
| Polyurethane | | | | |
| Oxazolin crosslink. | | | | |
| Silicone approach as in EP-A-0769540 | | | | |
| Share of P wt. % in antiglare coating | 10.7% | 15.8% | 4.8% | 11.4% |
| Dry coating thickness [nm] (for each side if coating is applied on both sides of film) | 80 | 80 | 105 | 80 | 0 | 80 | 80 |

| | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|
| Film recipe | | | | | | | |
| Coex layer A | 1 μm | 1 μm | 1 μm | 1 μm | 1 μm | 1 μm | 1 μm |
| PET4 (%) | 10.0 | 10 | 10.0 | 10.0 | 10.0 | 10.0 | 10.0 |
| PET3 (%) | 7.2 | 7.2 | 7.2 | 7.2 | 7.2 | 7.2 | 7.2 |
| PET1 (%) | 82.8 | 82.8 | 82.8 | 82.8 | 74.8 | 74.8 | 74.8 |
| PET2 (%) | | | | | 8.0 | 8.0 | 8.0 |
| Base layer | 17 μm | 17 μm | 17 μm | 17 μm | 17 μm | 17 μm | 17 μm |
| PET4 (%) | 10.0 | 10 | 10.0 | 10.0 | 10.0 | 10.0 | 10.0 |
| PET2 (%) | | | | | 8.0 | 8.0 | |
| PET1 (%) | 90.0 | 90 | 90.0 | 90.0 | 82.0 | 82.0 | 90.0 |
| Coex layer C' | 1 μm | 1 μm | 1 μm | 1 μm | 1 μm | 1 μm | 1 μm |
| PET4 (%) | 10.0 | 10 | 10.0 | 10.0 | 10.0 | 10.0 | 10.0 |
| PET3 (%) | 7.2 | 7.2 | 7.2 | 7.2 | 7.2 | 7.2 | 7.2 |
| PET1 (%) | 82.8 | 82.8 | 82.8 | 82.8 | 74.8 | 74.8 | 74.8 |
| PET2 (%) | | | | | 8.0 | 8.0 | 8.0 |
| Coating recipe | | | | | | | |
| Coating application on surface A or A&C | A&C | A | A&C | A&C | Un-coated | A&C | A&C |
| Acrylate | | | 13 | 10 | | 15 | 15 |
| Alkylphosphonate | | | | | | | |
| Ammonium phosphate | | | 2 | 5 | | | |
| Polyurethane | 7.5 | | | | | | |
| Oxazolin crosslink. | 7.5 | | | | | | |
| Silicone approach as in EP-A-0769540 | | 14 | | | | | |
| Share of P wt. % in antiglare coating | | | | | | | |
| Dry coating thickness [nm] (for each side if coating is applied on both sides of film) | 80 | 105 | 80 | 80 | 0 | 60 | 60 |

TABLE 3

Characteristics for Examples and Comparative Examples.

| | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Refractive index nD of Coating at 589 nm in MD | 1.503 | 1.483 | 1.522 | 1.523 | -/- | 1.508 | 1.508 |
| Transparency [%] | 96.5 | 95.6 | 96.4 | 93.5 | 90.4 | 93.3 | 96.2 |
| Haze [%] | 3.94 | 4.01 | 3.53 | 2.00 | 3.87 | 4.66 | 5.72 |
| Burning test before weathering | | | | | | | |
| No. of samples burning to mark after $1^{st}$ and $2^{nd}$ ignition | 5 | 4 | 5 | 5 | 3 | 5 | 5 |
| No. of samples burning to mark after $1^{st}$ ignition | 0 | 0 | 2 | 2 | 0 | 3 | 4 |

TABLE 3-continued

Characteristics for Examples and Comparative Examples.

| | | | | | | | |
|---|---|---|---|---|---|---|---|
| Burning test after weathering | | | | | | | |
| No. of samples burning to mark after 1st and 2nd ignition | 5 | 5 | 5 | 5 | 4 | 5 | 5 |
| No. of samples burning to mark after 1st ignition | 1 | 0 | 2 | 3 | 1 | 2 | 5 |

| | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|
| Refractive index nD of Coating at 589 nm in MD | 1.475 | 1.410 | 1.510 | 1.509 | -/- | 1.508 | 1.508 |
| Transparency [%] | 95.3 | 94.4 | 95.6 | 94.1 | 90.8 | 94.8 | 94.7 |
| Haze [%] | 7.09 | 2.4 | 8.54 | 27.1 | 2.3 | 3.5 | 3.5 |
| Burning test before weathering | | | | | | | |
| No. of samples burning to mark after 1st and 2nd ignition | 4 | 5 | 5 | 4 | 5 | 5 | 5 |
| No. of samples burning to mark after 1st ignition | 4 | 5 | 2 | 2 | 0 | 2 | 3 |
| Burning test after weathering | | | | | | | |
| No. of samples burning to mark after 1st and 2nd ignition | 5 | 5 | | | | 5 | 5 |
| No. of samples burning to mark after 1st ignition | 5 | 5 | | | | 4 | 4 |

The invention claimed is:

1. A greenhouse screen comprising strips of film material that are interconnected by a yarn system of transverse threads and longitudinal threads by means of knitting, warp-knitting or weaving process to form a continuous product, and at least some of said strips comprise a film material in the form of a single- or multilayered base film provided with at least one anti-glare/anti-reflective coating on a first surface of the base film, said film material has a transparency of at least 93.5% and comprises a total amount of particles of <0.5 wt. % as calculated on a total weight of the film material,
wherein
said at least first anti-glare/anti-reflective coating
has a dry thickness of between 60 and 130 nm; and
comprises at least one acrylic acid and/or a methacrylic acid based polymer; and
comprises at least one alkyl phosphonate and/or oligo-alkyl phosphonate flame retardant; and
contains phosphorus in an amount of between 2 wt. % and 18 wt. % as calculated based on a total weight of the coating.

2. The greenhouse screen according to claim 1, wherein said base film is provided with a second anti-glare/anti-reflective coating on a second surface of the film.

3. The greenhouse screen according to claim 2, wherein a refractive index of the anti-glare/anti-reflective coating(s) is lower than a refractive index of the base film and is below 1.64 at a wavelength of 589 nm when measured in a machine direction (MD) of the film.

4. The greenhouse screen according to claim 3, wherein said at least one acrylic acid and/or methacrylic acid based polymer consists of an ester of acrylic or methacrylic acid.

5. The greenhouse screen according to claim 1, wherein said at least one acrylic acid and/or methacrylic acid based polymer consists of at least 50 wt. % of one or more polymerized acrylic and/or methacrylic monomers.

6. The greenhouse screen according to claim 5, wherein said at least one acrylic acid and/or methacrylic acid based polymer comprises further co-monomers in a proportion of 0 to 15 wt. %, adapted to form an intermolecular crosslinking under an action of elevated temperature.

7. The greenhouse screen according to claim 1, wherein the dried anti-glare/anti-reflective coating(s) comprises less than 10 wt. % of repeating units containing an aromatic structural element.

8. The greenhouse screen according to claim 1, wherein the anti-glare/anti-reflective coating(s) comprises a flame retardant with the following structure (I) and/or (II)

(II)

wherein R1, R2, R3 and R4 are independent of each other and are each respectively: H; linear alkyl with —(CH$_2$)$_n$—CH$_3$ (n=0-7); isopropyl; iso- or tertbutyl; linear alkylalcohols with —(CH$_2$)$_n$—CH$_2$—OH (n=0-3), isopropylalcohol or linear alkyl acids/alkyl acid esters with structure —(CH$_2$)$_n$—COOR5 (with R5=H; —(CH$_2$)$_n$—CH$_3$ (n=0-3)); where at least one residual group (R1-R4) is not H, and Z may be of the group H; linear alkyl with —(CH$_2$)$_n$—CH$_3$ (n=0-10); isopropyl; iso- or tertbutyl; linear alkyl alcohols with —(CH$_2$)$_n$—CH$_2$—OH (n=0-5); isopropyl alcohols or linear alkyl acids/alkyl acid esters with structure —(CH$_2$)$_n$—COOR5 (with R5=H; —(CH$_2$)$_n$—CH$_3$ (n=0-3)).

9. The greenhouse screen according to claim 8, wherein the flame retardant is an oligo- and/or alkyl ester of phosphoric acid or phosphonic acid.

10. The greenhouse screen according to claim 8, wherein a proportion of phosphorus in the anti-glare/anti-reflective coating(s) is between 3 wt. % and 17 wt. %, when calculated based on the total weight of the anti-glare/anti-reflective coating.

11. The greenhouse screen according to claim 1, wherein the thickness of the anti-glare/anti-reflective coating(s) in each case is at least at least 70 nm and is at most 115 nm.

12. The greenhouse screen according to claim 1, wherein a total thickness of the film is at least 10 μm and at most 40 μm.

13. The greenhouse screen according to claim 1, wherein the base film comprises a base layer B and one or more further layers, said further layers having a thickness of at least 0.5 μm, and said thickness being less than 3 μm.

14. The greenhouse screen according to claim 1, wherein said base film comprises a UV stabilizer selected from the group consisting of triazines, benzotriazoles or benzoxazinones in at least one layer of the base film in a concentration of 0.3 to 3% by weight, based on a weight of the respective layer.

15. The greenhouse screen according to claim 1, wherein the base film comprises matting particles selected from the group consisting of crosslinked polymethyl methacrylate (PMMA), SiO$_2$, and polydimethyl siloxane (PDMSQ) in a concentration of <3 wt. % as calculated based on a total weight of each layer to improve a windability of the film.

16. The greenhouse screen according to claim 15, wherein at least one outer layer of the base film comprises at least 0.07% by weight of matting particles.

17. Use of the greenhouse screen according to claim 1, in a greenhouse environment for improving photosynthetic activity also during early morning hours or when sunlight radiates at a low incidence angle.

18. The greenhouse screen according to claim 1, wherein said base film is a polyester base film.

* * * * *